Jan. 1, 1952  B. BANNISTER  2,580,990
FISHING REEL
Filed Sept. 13, 1945  2 SHEETS—SHEET 1
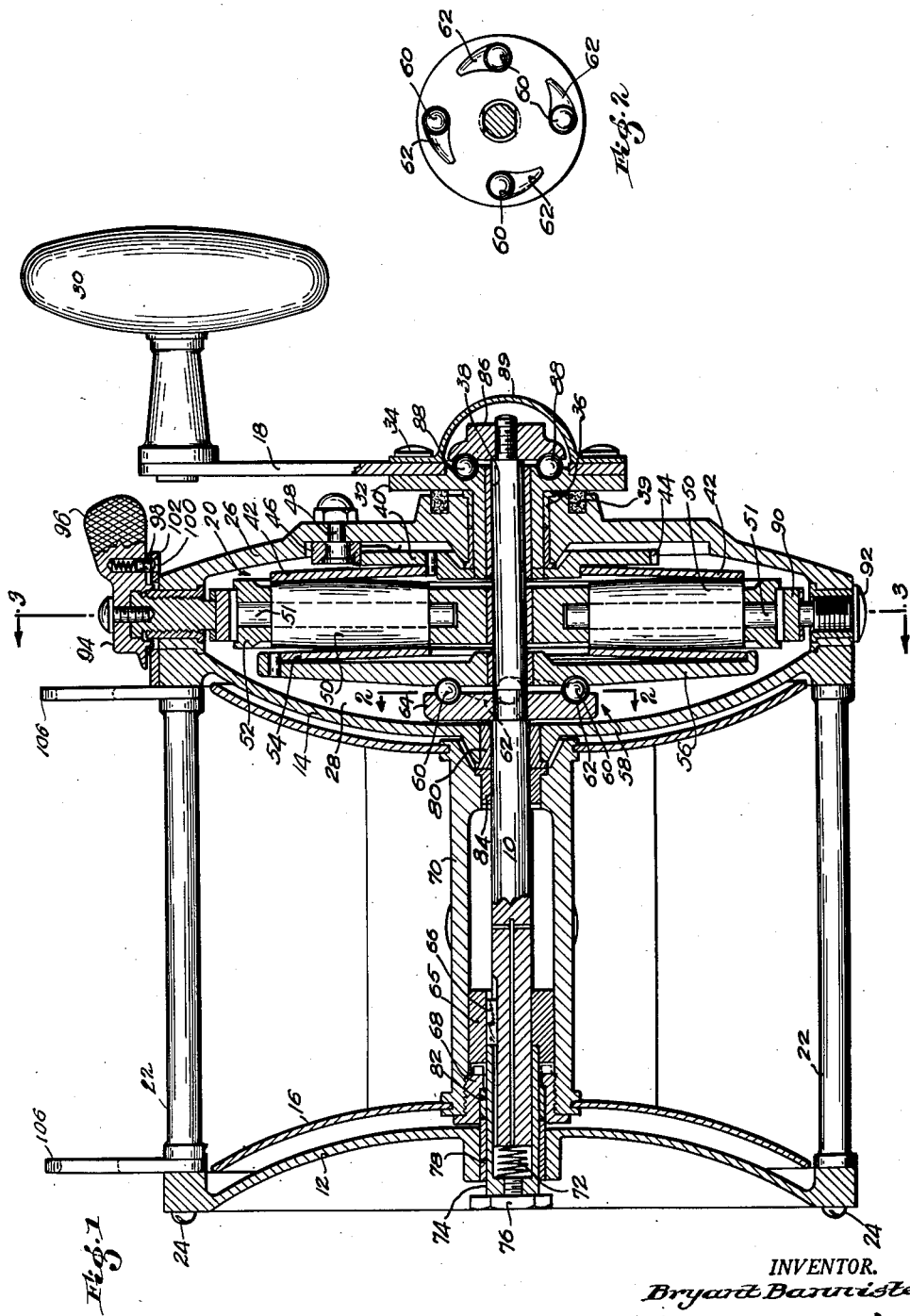
INVENTOR.
Bryant Bannister
BY J. Stanley Churchill
his Atty.

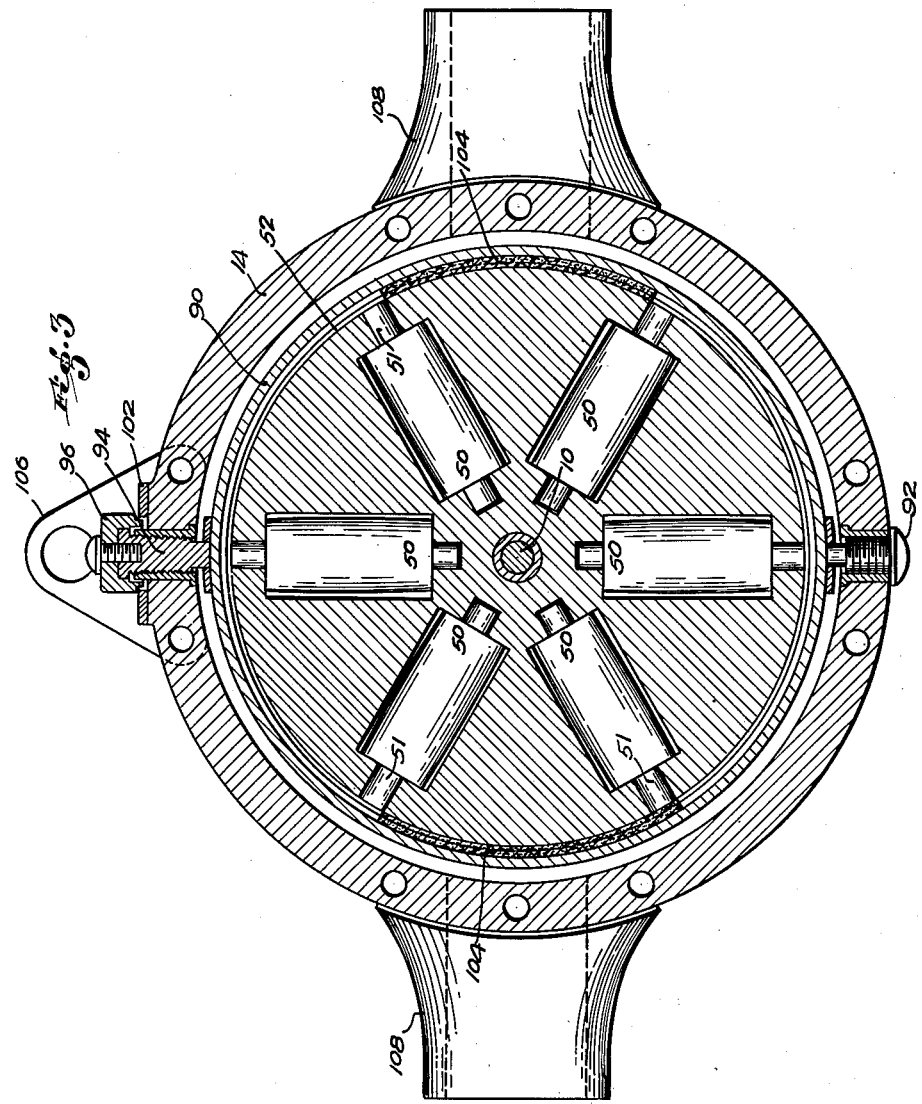

Patented Jan. 1, 1952

2,580,990

UNITED STATES PATENT OFFICE 2,580,990

FISHING REEL

Bryant Bannister, Pittsburgh, Pa.

Application September 13, 1945, Serial No. 616,021

9 Claims. (Cl. 242—84.5)

This invention relates to a fishing reel particularly adapted for heavy game fishing.

The invention has for a general object to provide a novel and improved fishing reel having variable speed driving connections between the crank and the spool and in which provision is made for automatically varying the speed ratio between the crank and the spool in accordance with the line tension. A further object of the invention is to provide a novel and superior construction of fishing reel which is better adapted for handling heavy game fish than prior reels of which I am aware.

With these general objects in view and such others as may hereinafter appear, the invention consists in the fishing reel and in the various structures, arrangements and combinations of parts hereinafter described and particularly defined in the claims at the end of this specification.

In the drawings illustrating the preferred embodiment of the invention, Fig. 1 is a cross sectional view of a fishing reel embodying the present invention; Fig. 2 is a detail view of a portion of the reel as viewed from the line 2—2 of Fig. 1; and Fig. 3 is a cross sectional view taken on the line 3—3 of Fig. 1.

In general, the present invention contemplates a fishing reel embodying variable speed driving connections between the crank and the spool wherein provision is made for automatically changing the ratio between the number of turns of the spool to the number of turns of the crank in accordance with the tension applied to the fishing line.

In heavy game fishing it is customary to trail the bait several hundred feet behind the boat. In the event that the bait is lost or damaged it is highly desirable to be able to reel the line in, make the necessary repairs, and to let out the line to again position the bait in a minimum of time. Also, when a hooked fish comes toward the boat at high speed it is desirable to be able to retrieve the line rapidly. Under such conditions, the tension on the line is light and the rapid reeling in could be accomplished by placing a high gear ratio between the crank and spool of the reel whereby one turn of the crank would produce several turns of the spool. However, with this ratio, the turning effort required to be applied at the crank would be approximately as many times greater than the line pull as the turns of the spool are greater than the turns of the crank. With such a high ratio relationship between the crank effort and the line pull it will be apparent that it would be practically impossible to reel in the line when a heavy fighting fish is hooked. It is therefore customary in the prior fishing reels to employ a compromise gear ratio between the crank and spool, and, a ratio in popular use on conventional reels provides two turns of the spool to one turn of the crank. With this ratio of two to one and assuming the crank length approximately equal to the radius of the winding spool, the tangential effort applied to the crank would be twice the line tension. Hence, with such prior conventional reels the line cannot be retrieved as rapidly as desired for bait inspection and the crank effort required to reel in a loaded line is too great for easy handling.

The present invention contemplates a novel and superior fishing reel embodying a variable speed mechanism by which the ratio of the turns of the spool to the turns of the crank may be automatically varied in accordance with line tension and to be highest with a light line tension and progressively lower as line tension increases. For example, in the illustrated embodiment of the invention, one turn of the crank may produce three turns of the spool when reeling in for bait inspection, and, one turn of the spool to one turn of the crank when a heavy line tension exists. For intermediate line tensions, the ratio of spool to crank turns may vary between three and one, in accordance with variations in the line tension.

In the illustrated embodiment of the invention, the tangential effort or torque applied to the crank produces an increasing tangential effort at the spool as the difference in relative speeds becomes less. For instance, if a three pound tangential effort applied to the crank produces a one pound line pull with the spool turning three times to the crank's one, this same three pound crank effort will provide substantially three pounds line pull when the crank and spool turn at the same rate. Assuming that the crank and winding diameters are substantially the same and that no mechanical losses occur, the ratio of crank effort to line pull varies directly as the ratio of spool turns to crank turns. Expressed more generally in terms of power input to power output for the usual case where the winding diameter varies and the crank length is constant, the line tension and the rate line is being recovered will be substantially equal to the tangential effort applied to the crank, and the distance traveled( in unit time) by the crank handle. Mathematically expressed this relationship comprises:

With

P=line tension in pounds (#).
R=radius of winding in inches.
N=number of turns of spool per minute.
T=tangential effort applied to crank handle, in pounds (#).
C=length of crank in inches.
N=number of turns of crank per minute.

Then: $P \times N (2\pi R) = T \times N_1 (2\pi C)$ and $PRN = TCN_1$

To illustrate with a typical case, assume the radius of the line winding and the length of the crank to be equal and that up to five pounds line tension the spool turns three times to one turn of the crank. Then, when the line tension is five pounds the required crank effort would be:

$$T = \frac{PN}{N_1} = \frac{5 \times 3}{1} = 15\#$$

Now assume the reel mechanism is so arranged that when the line tension reaches fifteen pounds the spool to crank turn ratio has reduced to one. Then, the crank effort required to match the line pull would be:

$$T = \frac{PN}{N_1} = \frac{15 \times 1}{1} = 15\#$$

For greater line tensions the ratio would remain 1:1 and the crank effort would equal the line pull. It will be understood that the above values may be varied over a wide range in the design and adjustment of the reel to suit any particular condition.

Referring now to the drawings, in general, the present fishing reel comprises a shaft 10 suitably journaled in frame members 12, 14; a winding spool 16 mounted for rotation with the shaft 10; a crank 18; and variable speed driving connections, indicated generally at 20 for operatively connecting the crank to the shaft. As herein shown, the frame members 12, 14 are assembled in spaced relation by tie rods 22 and screws 24, and, a housing member 26 attached to the end frame member 14 forms therewith an oiltight chamber 28 in which the variable speed driving connections 20 are disposed.

As herein illustrated, the crank 18, which may be provided with a suitable handle 30, is attached to a flanged hub member 32 by screws 34, and, the hub member is mounted for rotation in a bushing 36 provided in the housing member 26. The shaft 10 is concentric with and extends through the flanged hub member 32 and is supported for relative rotation with the hub member in a bushing 38 provided in the latter. A felt, or other suitable, washer 39 supported in a groove in the housing member 26 may be arranged to bear against the flanged portion of the crank hub 32 to form an oil seal.

As shown in Fig. 1, the flanged hub member 32 extends within the chamber 28 and has keyed thereto a plate 40 arranged to support a flexible dished washer or deflecting disc 42, known commercially as a "Belleville" spring, comprising the driving member of the variable speed unit 20. The plate 40 may also be provided with ratchet teeth 44 arranged to cooperate with a spring pressed pawl 46 in order to prevent reverse or counterclockwise rotation of the crank. The pawl 46 is pivotally mounted on a stud 48 fast in the housing member 26.

The disc 42 is fixed at its inner periphery and free to flex at its outer periphery and is arranged to tangentially engage and frictionally rotate a plurality of barrel shaped rollers 50 rotatably mounted on shafts 51 fixed in a normally stationary carrier 52, the rollers having their axes radially arranged with respect to the shaft 10. A second deflecting disc 54, comprising the driven member of the variable speed unit 20, is attached to a circular plate 56 rotatably mounted on the shaft 10. The second deflecting disc is secured at its outer periphery and free to flex at its inner periphery and is arranged to tangentially engage the opposite side of the radially arranged rollers 50. The rotation of the circular plate 56 is transmitted to the shaft 10 through an expansible roller clutch 58 comprising a plurality of spherical balls 60 which are arranged to ride in corresponding opposed sloped race ways 62 cut in one face of the circular plate 56 and in a cooperating circular member 64 fast on the shaft 10.

In the illustrated embodiment of the invention, the shaft 10 is detachably connected to the spool 16 through a jaw clutch comprising a member 65 slidably keyed to the shaft by a key 66, and a cooperating member 68 secured to the hub 70 of the spool 16. The slidable clutch member 65 is urged into engagement with the spool clutch member 68 by a spring 72 interposed between the end of the shaft 10 and the inner face of a hollow plunger 74 which is attached at one end to the movable clutch member 65. The other end of the plunger 74 extends beyond the frame member 12 and is provided with a button 76. With this construction it will be seen that when the button 76 is pressed the jaw clutch may be disengaged to free the spool 16 from the shaft 10. As herein shown, the end of the shaft 10 is supported within the hollow plunger 74, the latter being rotatably journaled in a bushing 78 provided in the end frame member 12, and, a bushing 80 in the frame member 14 supports the intermediate portion of the shaft, as shown. When the spool 16 is free from the shaft 10 it rotates about the plunger 74 at one end and about the shaft 10 at the other end, the member 68 and hub 70 being provided with bushings 82, 84 respectively.

The variable speed driving elements 20 are maintained in operative relation between the circular plate 64 and the extended end of the shaft by a nut 86 which, when tightened up as illustrated in Fig. 1, effects initial pressure engagement of the spring discs 42, 54 with the intermediate rollers 50. The spherical balls 88 interposed between the nut 86 and the crank hub member 32 serve as a thrust bearing. In practice, tightening of the nut 86 causes a partial flattening of the discs to present the outer periphery of the driving disc 42 against the extreme outer ends of the radially arranged barrel shaped rollers 50, and, to present the inner periphery of the driven disc 54 against the extreme inner ends of the rollers, at which time the spherical balls 60 of the expansible roller clutch are seated in the deepest portions of the opposed sloped races 62. A cap member 89 may be provided to cover the nut 86 to prevent tampering therewith and to provide a finished appearance.

In operation, the initial pressure thus effected between the discs 42, 54 and the rolls 50 provides sufficient traction so that when the crank 18 is turned in a clockwise direction the rolls serve similar to idler gears to drive the disc 54, plate 64 and spool 16 in a counterclockwise direction at a rate of rotation in the ratio of the contact radii of the spring discs 42 and 54 respectively. Thus, with the proportions illustrated in Fig. 1, one turn of the crank 18 will produce approximately three turns of the spool 16. This ratio will remain substantially constant until the tension of the line wound on the spool 16 reaches a predetermined amount, which amount would normally be a fraction of the maximum. Thereafter, as the line tension is increased beyond such predetermined amount, as when playing a fish, the spherical balls 60 will begin to ride up the slopes of their races 62, effecting separation of the plates 56, 64 and compression of the spring discs 42, 54 causing the discs to flatten out until they eventually reach their extreme position at which time they are completely flat and parallel to each other.

The compressing action thus effected causes the contact point of the driving disc 42 with the rolls 50 to move radially inward, and the contact point of the driven disc 54 to move radially outward corresponding distances until such contact points are opposite one another at which time the spherical balls 60 have reached the shallow ends of the sloped races 62. In practice, the amount of slope of the races 62 and the degree of stiffness of the spring discs 42, 52 determines the increase in the line tension necessary to cause the discs to reach a parallel condition. When a state of parallelism of the discs is reached they contact the barrel shaped rolls 50 at midlength and at opposite points. The radii are then equal and the turn ratio of the spool to the crank is one to one, that is, both the crank and the spool turn at the same rate. Obviously, the proportions of the various elements may be varied such that a ratio of less than one to one could be reached. When the line tension is between the two extremes, the turn ratio will also be between the extremes and in proportion to the line tension. The action is in effect analogous to a stepless variable gear ratio between the spool and the crank. As line tension is reduced from the maximum the spring action of discs 42, 54 causes the spherical balls 60 to roll backward in their races 62 thus automatically increasing the spool to crank turn ratio.

From the description thus far it will be observed that the ratio of the number of turns of the crank to the number of turns of the spool is automatically varied in accordance with an increase or decrease in tension on the line whereby a high ratio is obtained when the line is relatively free, and, a low ratio is obtained when a relatively heavy tension on the line exists, thus making it possible to reel the line in quickly for bait inspection or repair, and reducing to a minimum the turning effort or torque required to be applied to the crank when the line is heavily loaded.

The above description has been confined to the conditions applying during reeling in of the line, although it will be apparent that the line may be paid out by freeing the spool from the shaft through releasing the jaw clutch, as described. However, provision is also made in the illustrated fishing reel for permitting unwinding movement of the spool when a predetermined maximum limit of tension on the line is reached. As above described, the ratchet plate 40 and pawl 46 prevent counterclockwise movement of the crank 18 and the spring disc 42. Thus, when the line is being drawn off the spool, the spool turns in a direction reverse to that when the line is being retrieved, and, since the spring disc 42 cannot be rotated in a reverse direction, the disc 54 tends to rotate the rolls 50 and with them the carrier 52. Assuming that no resistance is offered to the rotation of the carrier about the shaft 10 during such unwinding it will be seen that there would be little or no resistance to the turning of the spool 16, and, the rolls 50 would simply roll around on the stationary spring disc 42 in a manner similar to a sulky wheel rolling around a circular track and carrying the sulky in a circular path.

Referring now to Fig. 3, in order to effect such action provision is made for braking the carrier 52 in a manner such as to prevent rotation thereof during normal line tensions, and, to permit rotation of the same when a predetermined maximum line tension is reached. As herein shown, the brake comprises a circular spring member 90 comprising a narrow hoop of spring steel supported between a fixed screw 92 carried by the housing member 26 and a diametrically opposed adjustable screw 94 provided with a handle 96 and a spring pressed pin 98 arranged to be received into one of several openings 100 in a stationary plate 102. The hoop 90 is restrained from rotation but can be deformed into more or less of an oval by the adjusting screw 94. Secured to the interior of the hoop are two diametrically opposed friction pads 104 which press against the outer perimeter of the carrier 52, thus restraining the rotation of the carrier more or less in accordance with the adjustment of the screw 94. Thus, it will be seen that until the tension on the line or resistance to rotation of the spool reaches an amount sufficient to cause the carrier 52 to slip under the braking pads 104, whether the line is being reeled in or drawn off, there will be no movement of the carrier, and, that the braking effect on the carrier determines the maximum tension which can be placed on the line.

The reel may be provided with the usual eyelets 106 for attachment to a harness worn by the fisherman. When the reel is in operative position the forward bracket 108 is equipped with the tip portion of the fishing rod while the rearward bracket 108 houses the butt section. It should be understood that the reel frame may be provided with a bracket for mounting on top of the rod if desired in preference to the centerline construction shown.

From the above description of the construction and mode of operation of the present fishing reel it will be observed that the speed ratio between the crank and the spool is automatically varied in accordance with the resistance to rotation or line tension applied to the spool so that as the line tension decreases, one turn of the crank produces an increasing number of turns of the spool, thus permitting a relatively light or free line to be reeled in quickly, and, conversely, as the line tension increases, one turn of the crank produces a decreasing number of turns of the spool, thus in effect reducing the speed of the spool and consequently decreasing the required tangential effort or torque applied to the crank when a relatively heavy fish is hooked.

While the preferred embodiment of the invention has been herein illustrated and described, it will be understood that the invention may be embodied in other forms within the scope of the following claims.

Having thus described the invention, what is claimed is:

1. In a fishing reel, a frame, a shaft rotatably mounted in the frame, a spool mounted for rotation with the shaft, a crank, and variable speed driving means operatively connecting the crank and the shaft comprising a carrier having a roller mounted therein, said variable speed driving means having provision for and being capable of effecting rotation of the spool at maximum and minimum speeds with relation to the crank speed and also through a substantial number of intermediate speeds between said maximum and minimum spool speeds, a connection between said crank and said roller for rotating the same, a spring disc operatively connected to the shaft and in tangential engagement with said roller to effect rotation of the shaft, and means for varying the point of tangential engagement of said disc with relation to the roller through flexing of said spring disc whereby to change the turn ratio between the crank and the shaft.

2. In a fishing reel, a frame, a shaft rotatably mounted in the frame, a spool mounted for rotation with the shaft, a crank, and variable speed driving means operatively connecting the crank and the shaft comprising a carrier having a plurality of rollers mounted therein, a spring disc fixed to said crank and in tangential driving engagement with one side of said rollers, a second spring disc operatively connected to the shaft and in tangential engagement with the other side of said rollers to effect rotation of the shaft, and means for varying the point of tangential engagement of said spring discs with relation to the rollers through flexing of said spring discs whereby to change the turn ratio between the crank and the spool, said variable speed driving means having provision for and being capable of effecting rotation of the spool at maximum and minimum speeds with relation to the crank speed and also through a substantial number of intermediate speeds between said maximum and minimum spool speeds.

3. In a fishing reel, a frame, a shaft rotatably mounted in the frame, a spool mounted for rotation with the shaft, a crank, and variable speed driving means operatively connecting the crank and the shaft comprising a carrier having a plurality of rollers mounted therein, a spring disc fixed to said crank and in tangential driving engagement with one side of said rollers, a second spring disc operatively connected to the shaft and in tangential engagement with the other side of said rollers to effect rotation of the shaft, and means for automatically varying the point of tangential engagement of said spring discs with relation to the rollers through flexing of said spring discs in accordance with the resistance to rotation applied to said shaft whereby to change the turn ratio between the crank and the spool, said variable speed driving means having provision for and being capable of effecting rotation of the spool at maximum and minimum speeds with relation to the crank speed and also through a substantial number of intermediate speeds between said maximum and minimum spool speeds.

4. The combination with a fishing reel having a shaft, a spool mounted for rotation with the shaft, and a crank, of variable speed driving mechanism operatively connecting the crank to the shaft including a roller and a deflecting disc in tangential engagement with said roller, and an expansible clutch interposed between said deflecting member and the shaft operative to automatically flex said deflecting member to change the point of tangential contact between the disc and the roller to vary the turn ratio of spool to crank in accordance with the degree of resistance to rotation applied to said spool.

5. In a fishing reel, a frame, a shaft rotatably mounted in the frame, a spool mounted for rotation on the shaft, a crank, and variable speed driving means operatively connecting the crank and the shaft comprising a stationary carrier having a plurality of barrel shaped rollers rotatably mounted therein on axes radial to said shaft, a conically shaped deflecting disc fixed at its inner periphery and free to flex at its outer periphery carried by said crank and in tangential engagement with one side of said rollers adjacent their outer ends, a second conically shaped deflecting disc mounted for rotation about the shaft fixed at its outer periphery and free to flex at its inner periphery and in tangential engagement with the other side of said rollers adjacent their inner ends, and an expansible roller clutch interposed between said second disc and the shaft for automatically flexing said deflecting discs to change the point of tangential contact between the discs and the barrel shaped rollers whereby to vary the turn ratio of spool to crank in accordance with the degree of resistance to rotation applied to said spool.

6. The combination with a fishing reel having a shaft, a spool mounted for rotation with the shaft, and a crank, of variable speed driving mechanism operatively connecting the crank to the shaft including a roller and a deflecting disc in tangential engagement with said roller, and an expansible clutch interposed between said deflecting member and the shaft operative to automatically flex said deflecting member to change the point of tangential contact between the disc and the roller to vary the turn ratio of spool to crank in accordance with the degree of resistance to rotation applied to said spool, said expansible clutch comprising a circular disc rotatably mounted and axially movable on said shaft, a second circular disc fast on the shaft, said circular discs having their adjacent faces provided with opposed circumferentially sloped ball races, and a plurality of spherical balls seated in said opopsed races forming a driving connection between said circular discs, said spherical balls being seated in the deepest portions of their cooperating races when a relatively low degree of resistance to rotation is applied to the spool, and adapted to ride up the sloped races to the shallow portion thereof to effect axial movement of said first circular disc when the degree of resistance to rotation applied to the spool is relatively great.

7. In a fishing reel, a frame, a shaft rotatably mounted in the frame, a spool mounted for rotation with the shaft, a crank, and variable speed driving means operatively connecting the crank and the shaft comprising a carrier having a plurality of rollers mounted therein, a spring disc fixed to said crank and in tangential engagement with one side of said rollers, a second spring disc operatively connected to the shaft and in tangential engagement with the other side of said rollers to effect rotation of the shaft, and means for automatically varying the point of tangential engagement of said spring discs with relation to the rollers in accordance with the resistance to rotation applied to said shaft whereby to change the turn ratio between the crank and the spool, means for preventing reverse rotation of said crank, and a brake adapted to be adjusted to hold said carrier stationary during normal resistance to rotation applied to said spool and to permit slipping of said carrier about the shaft to permit reverse rotation of said spool when a predetermined limit of said resistance is reached.

8. In a fishing reel having a line winding spool and a manually operable crank, a transmission arranged to transmit torque from said crank to said spool, said transmission including adjustable elements for establishing a plurality of successive and progressive inversely variable torque and speed ratios between said crank and spool, torque responsive elements rotatable with said spool, said elements being movable relative to each other in an amount proportional to said torque, and means for transmitting said relative movement to said adjustable elements, said means being arranged to effect adjustment of said adjustable elements so as to increase the torque ratio from said crank to said spool in response to an increase in the torque transmitted.

9. A fishing reel as defined in claim 8 wherein said transmission further includes a normally stationary reaction member, friction means normally holding said reaction member stationary but by its created friction permitting energy dissipating movement thereof at a predetermined maximum value of torque transmitted.

BRYANT BANNISTER.

REFERENCES CITED

The following references are of record in the file of this patent:

UNITED STATES PATENTS

| Number | Name | Date |
|---|---|---|
| 568,367 | Osgood | Sept. 29, 1896 |
| 838,915 | Sykes | Dec. 18, 1906 |
| 1,431,710 | Uno | Oct. 10, 1922 |
| 1,697,851 | Case | Jan. 8, 1929 |
| 2,332,481 | Boor | Oct. 19, 1943 |
| 2,417,732 | Bland et al. | Mar. 18, 1947 |

FOREIGN PATENTS

| Number | Country | Date |
|---|---|---|
| 254,218 | Great Britain | July 1, 1926 |